Feb. 1, 1966 G. A. GIBSON ETAL 3,233,229

APPARATUS FOR THE REPRODUCTION OF DIGITAL DATA RECORDED ON A PLURALITY OF PARALLEL TRACKS ON A RECORDING MEDIUM

Filed Nov. 3, 1961 5 Sheets-Sheet 1

INVENTORS
GEORGE ANGUS GIBSON
DAVID CHARLES TYLER
BY Kirschstein, Kirschstein & Ottinger
ATTORNEYS INVENTORS
GEORGE ANGUS GIBSON
DAVID CHARLES TYLER
BY Kinsleten, Kinsleten & Ottinger
ATTORNEYS Feb. 1, 1966 G. A. GIBSON ETAL 3,233,229

APPARATUS FOR THE REPRODUCTION OF DIGITAL DATA RECORDED ON A PLURALITY OF PARALLEL TRACKS ON A RECORDING MEDIUM

Filed Nov. 3, 1961 5 Sheets-Sheet 3

INVENTORS
GEORGE ANGUS GIBSON
DAVID CHARLES TYLER
BY Kirschstein, Kirschstein & Ottinger
ATTORNEYS INVENTORS
GEORGE ANGUS GIBSON
DAVID CHARLES TYLER
BY Kirschstein, Kirschstein & Ottinger
ATTORNEYS Feb. 1, 1966 G. A. GIBSON ETAL 3,233,229

APPARATUS FOR THE REPRODUCTION OF DIGITAL DATA RECORDED ON A PLURALITY OF PARALLEL TRACKS ON A RECORDING MEDIUM

Filed Nov. 3, 1961 5 Sheets-Sheet 5

INVENTORS
George Angus Gibson
David Charles Tyler
BY Kirschstein, Kirschstein & Ottinger
ATTORNEYS United States Patent Office 3,233,229

Patented Feb. 1, 1966

3,233,229

APPARATUS FOR THE REPRODUCTION OF DIGITAL DATA RECORDED ON A PLURALITY OF PARALLEL TRACKS ON A RECORDING MEDIUM

George Angus Gibson, Stevenage, and David Charles Tyler, Hitchin, England, assignors to The General Electric Company Limited, London, England Filed Nov. 3, 1961, Ser. No. 150,023
Claims priority, application Great Britain, Nov. 14, 1960, 39,057/60
5 Claims. (Cl. 340—174.1)

Figure 1:
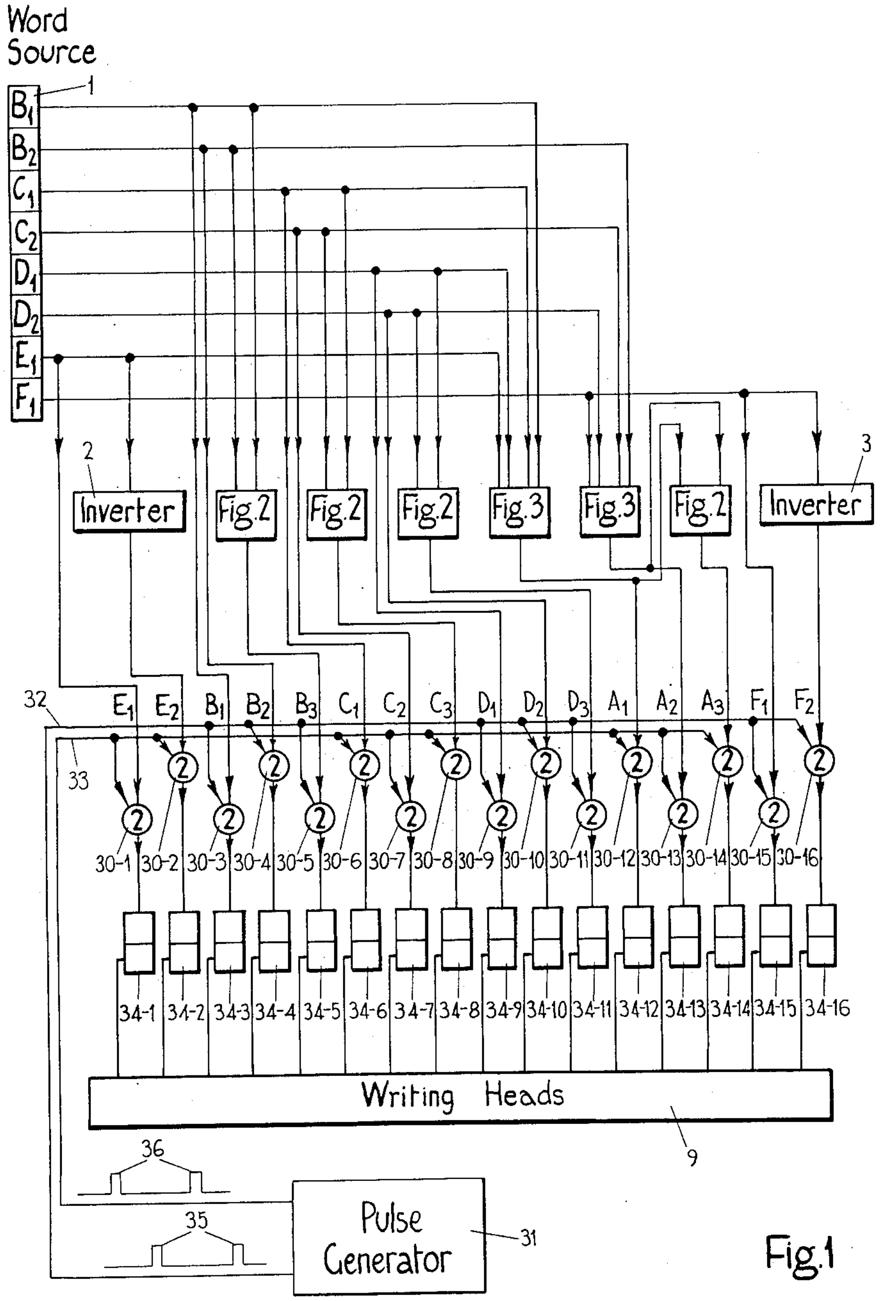

This invention relates to apparatus for the reproduction of digital data recorded on a plurality of parallel tracks on a recording medium.

More particularly, but not exclusively, the invention is concerned with the reproduction of digital data recorded on a plurality of parallel tracks on a magnetic tape or other magnetic recording medium such, for example, as a magnetic drum.

For the purpose of feeding data into a digital computer, it is known to record successive groups of binary digits on a magnetic tape so that the several digits of information making up each group are recorded simultaneously on separate parallel tracks along the tape. Thus, for the purpose of reproducing such a recorded group of digits, it is usually necessary to read off simultaneously from all the tracks at a particular position along the tape. To identify the position of each group of digits, it is known also to provide an extra track, sometimes referred to as a "clock track." It will be appreciated, however, that a clock track does not, in itself, provide any useful information and is therefore wasteful of the available storage space on the tape.

One object of the present invention is to provide apparatus for the reproducing of recorded data in which the necessity for a clock track is avoided.

If in the prior arrangement discussed above, successive groups of digits are closely spaced along the tape and there is any distortion of the tape after it has been recorded, or if the reading heads are slightly out of alignment, it is possible that at the time a particular group of digits is to be read out, some of the heads will read out digits from an adjacent group recorded on the tape. In such circumstances the data actually read out is useless and it is therefore necessary to space the groups of digits sufficiently far apart to ensure that this situation does not occur. (In this connection it may be mentioned that although the provision of a clock track along the centre of the tape may ease this problem it does not provide a complete solution.)

Another object of the invention is, therefore, to provide apparatus in which the likelihood of faulty operation as discussed in the last paragraph, is reduced.

According to the present invention, in apparatus for the reproduction of digital data which is so recorded on a plurality of parallel tracks on a recording medium that between successive groups of digits recorded one on each of a first group of said tracks there are groups of digits similarly recorded on a second group of said tracks, there is storage means for storing the digits read off from the first group of tracks until a digit is read off from the second group of tracks whereupon said means supplies electric outputs that are characteristic of the digits recorded on the first group of tracks.

According to a feature of the invention, in apparatus for the reproduction of binary data which is so recorded on a plurality of parallel tracks that along the recording medium between successive groups of binary digits recorded one on each of a first group of said tracks there are groups of binary digits similarly recorded on a second group of tracks, there is first storage means for storing digits read off from the first group of tracks until digits are read off from the second group of tracks whereupon this means supplies electric outputs that are characteristics of the digits recorded on the first group of tracks and second storage means for storing digits read off from the second group of tracks until digits are read off from the first group of tracks whereupon this means supplies electric outputs that are characteristic of the digits recorded on the second group of tracks.

According to another aspect of the present invention, in apparatus for the reproduction of digital data recorded on a plurality of parallel tracks, there is provided storage means for storing digits read off from a first plurality of said tracks and control means responsive at least to digits read off from a second plurality of said tracks which are adjacent to said first plurality of tracks, the storage means being arranged to supply electric outputs that are characteristic of the digits read off from the first plurality of tracks upon the control means being responsive as aforesaid.

The second plurality of tracks may be arranged so that there is at least one on either side of the first plurality of tracks. Furthermore the digits recorded on the first plurality of tracks may be at different positions along the record medium to those recorded on said second plurality of tracks.

If the recording medium has first and second groups of parallel tracks on each of which are recorded groups of digits, one digit of each group being recorded on each of the appropriate group of tracks and groups of digts recorded on the first and second groups of tracks alternating along the recording medium, and the groups of digits are each divided into sub-groups which are each recorded on a plurality of adjacent tracks while those of the first group of tracks on which sub-groups of digits are recorded are interleaved with similarly arranged tracks of the second group of tracks, apparatus in accordance with the invention may have a plurality of first, second and third storage means, one of each such means being associated with each of the tracks and the arrangement being such that each digit read from the recording medium is stored by the appropriate first storage means, information in respect of each of said sub-groups of digits is transferred from the appropriate first storage means to the appropriate second storage means when information in respect of a sub-group of digits is read from the plurality of tracks adjacent to those from which the sub-group in question had previously been read, and information in respect of each group of digits is transferred from the appropriate second storage means to the appropriate third storage means when information previously read from one of said groups of tracks is stored by the second storage means in respect of all sub-groups of a group of digits read from the other group of tracks.

Figures 2, 3, 7, 8, 9:
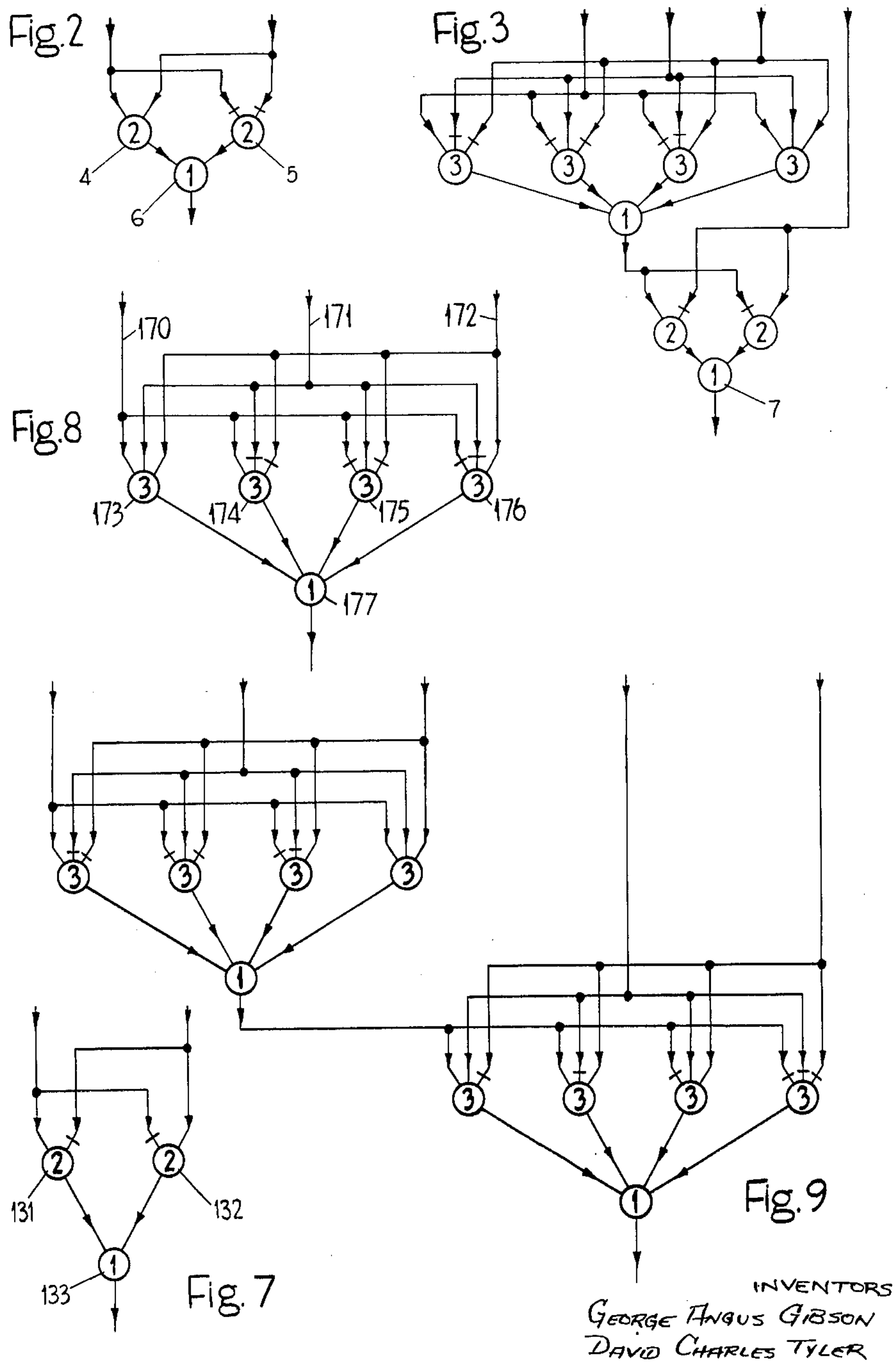
Figure 4:
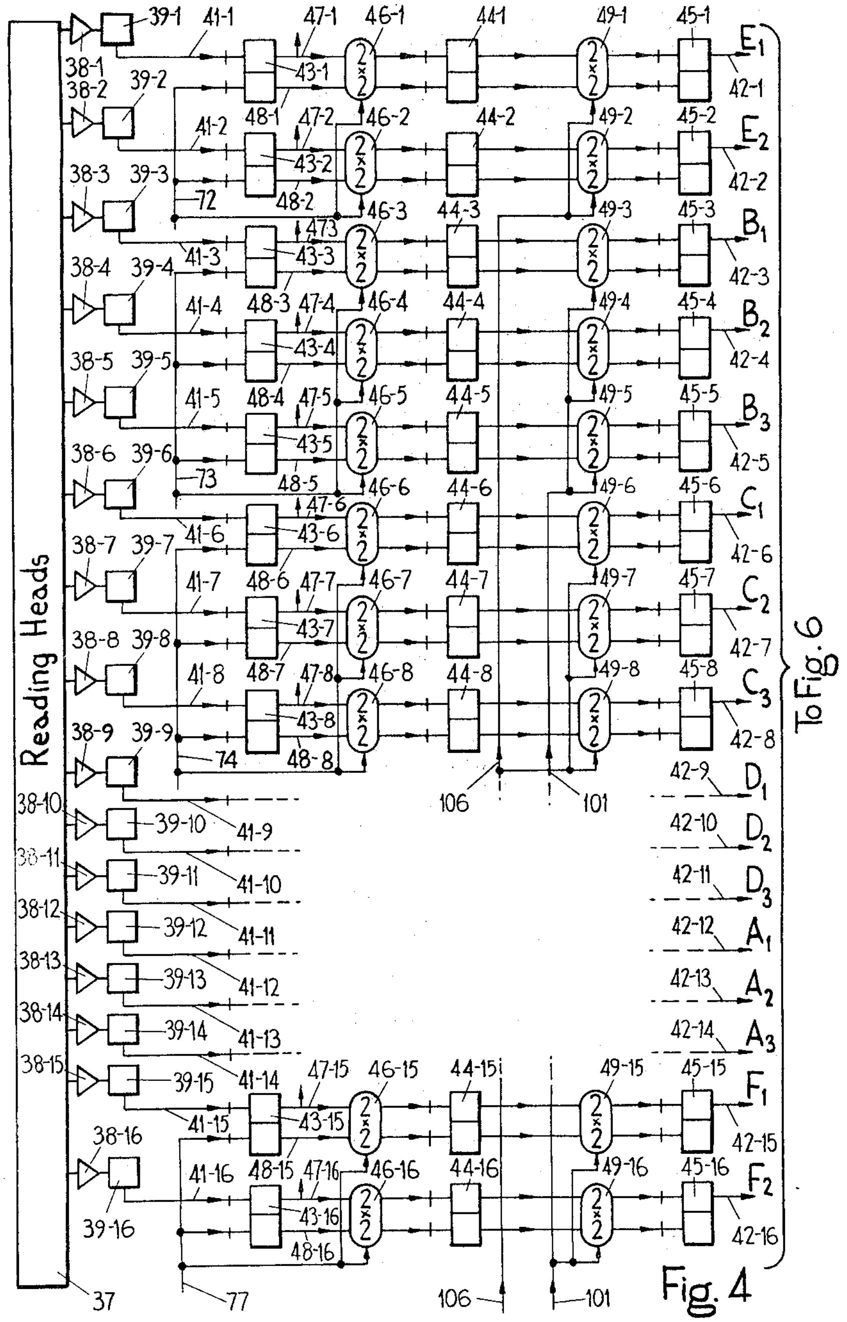
Figure 5:
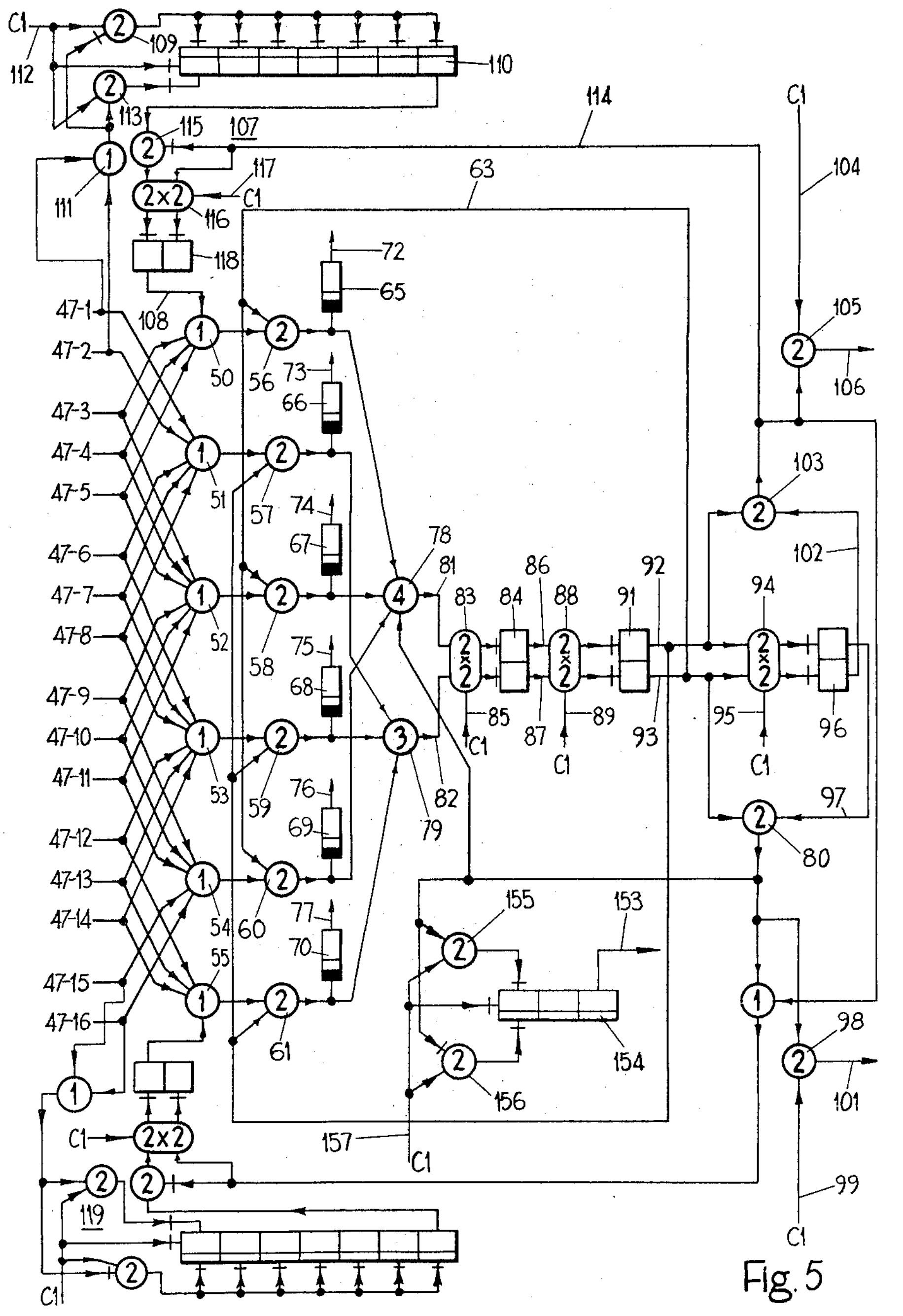
Figure 6:
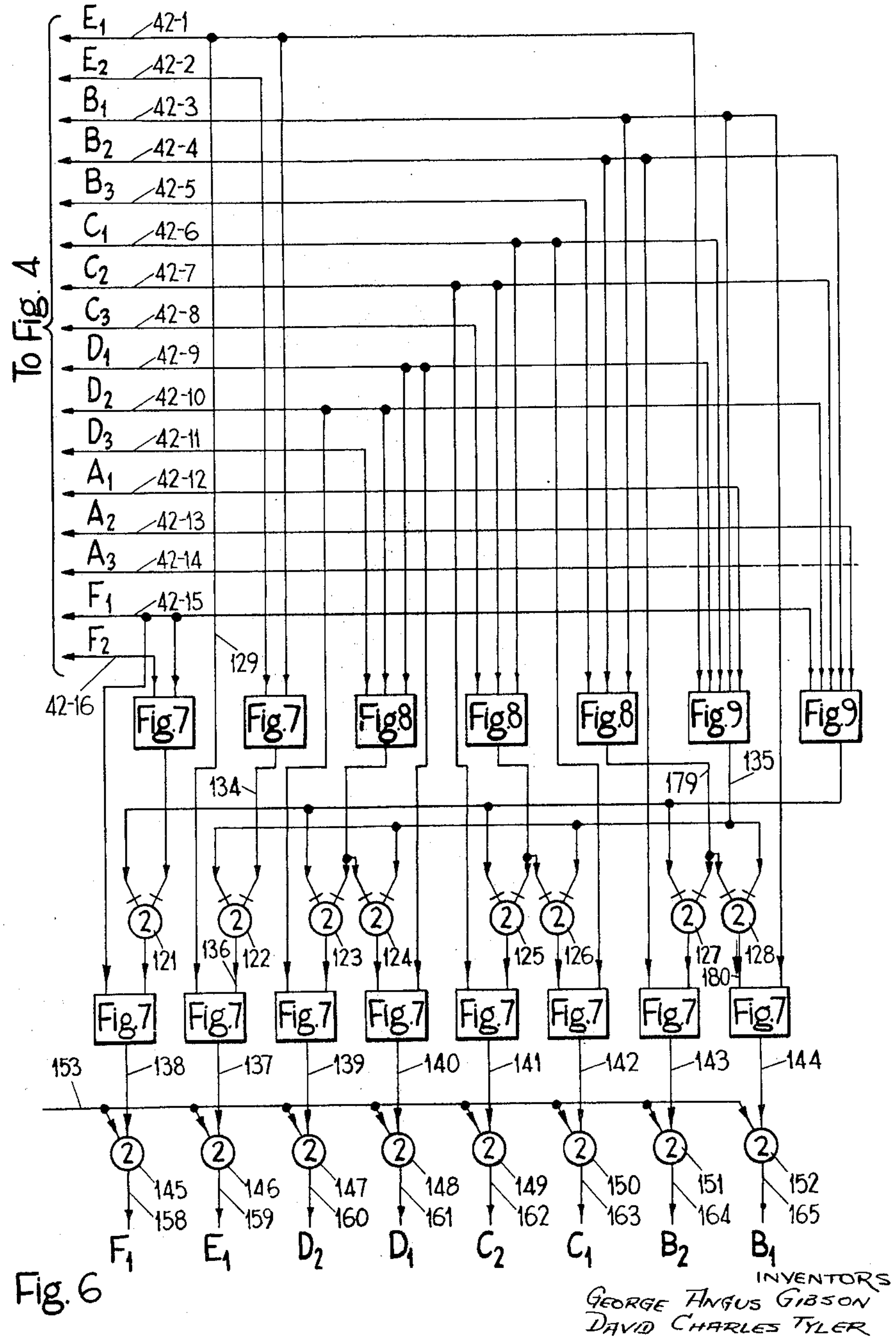

One example of a system which is for recording and reproducing binary data and which includes apparatus in accordance with the invention will now be described with reference to the accompanying drawings in which:

FIGURE 1 shows diagrammatically the circuit of apparatus for recording the data, FIGURES 2 and 3 show diagrammatically the circuits of parts of FIGURE 1 in more detail, FIGURES 4, 5 and 6 show diagrammatically the circuit of apparatus for reproducing the recorded data and, FIGURES 7, 8 and 9 show diagrammatically the circuits of parts of FIGURE 6 in more detail.

It may be mentioned here that, as far as possible the various symbols used in FIGURES 2 to 9 in respect of gates and other devices are as specified in supplement No. 5 (1957) to British standard specification No. 530:1948.

In the system now to be described, information in respect of a succession of groups of eight binary digits is recorded in parallel on a plurality of tracks along a magnetic tape. (For the purpose of the present description it is convenient to refer to each such group of eight digits as a "word" although it is to be understood that these words do not necessarily correspond to the words handled by a digital computer with which the present system may be used, the computer words usually consisting of rather more binary digits.) In fact the information actually recorded in respect of each word consists not only of digits making up that word but also eight additional binary digits which are derived from the digits making up the word in such a manner that any single error in the recorded information that is subsequently read off can be detected and corrected.

If now the eight digits making up each word are accorded the references $B_1$, $B_2$, $C_1$, $C_2$, $D_1$, $D_2$, $E_1$ and $F_1$ and the eight additional digits are accorded the references $A_1$, $A_2$, $A_3$, $B_3$, $C_3$, $D_3$, $E_2$ and $F_2$, the manner in which the additional digits are derived will now be described with reference to the following table:

*Table I*

| | | | | | |
|---|---|---|---|---|---|
| $B_1$ | $C_1$ | $D_1$ | $E_1$ | ----- | $A_1$ |
| $B_2$ | $C_2$ | $D_2$ | ----- | $F_1$ | $A_2$ |
| $B_3$ | $C_3$ | $D_3$ | $E_2$ | $F_2$ | $A_3$ |

Since the eight digits constituting the word to be recorded are binary digits, each of the digits $B_1$, $B_2$, $C_1$, $C_2$, $D_1$, $D_2$, $E_1$ and $F_1$ can be considered as having a value of either "0" or "1." The binary digit $A_1$ is chosen so that it gives even parity to the top row of digits in Table I. Thus if the number of the digits $B_1$, $C_1$, $D_1$ and $E_1$ corresponding to "1" is odd then the digit $A_1$ is made equal to "1" while if that number is even the digit $A_1$ is made equal to "0." Similarly the digit $A_2$ is chosen to give even parity to the second row of Table I.

The digit $B_3$ is chosen to give odd parity to the lefthand colume of Table I. Thus if the digits $B_1$ and $B_2$ are both equal to either "0" or "1," the digit $B_2$ is made equal to "1" while if one of the digits $B_1$ and $B_2$ is "0" and the other is "1," the digit $B_3$ is made equal to "0." Similarly the digits $C_3$, $D_3$, $E_2$, $F_2$ and $A_3$ are chosen to give odd parity to the remaining columns of Table I. (It may be mentioned that the digit $A_3$ can equally well be regarded as giving odd parity to the righthand column of Table I or to giving even parity to the bottom row of that table.)

The circuitry for deriving the digits $A_1$, $A_2$, $A_3$, $B_3$, $C_3$, $D_3$, $E_2$ and $F_2$ is shown in FIGURE 1 of the accompanying drawings. In that figure eight binary signals corresponding to the digits $B_1$, $B_2$, $C_1$, $C_2$, $D_1$, $D_2$, $E_1$ and $F_1$ are supplied in parallel by a source 1 which may, for example, be a device for reading punched tape.

It will be noted from Table I that since the digit $E_2$ is chosen to give odd parity to the fourth column from the left in that table, it follows that if $E_1$ is equal to "0," $E_2$ must be equal to "1" while if $E_1$ is equal to "1," $E_2$ must be equal to "0." The signal corresponding to $E_2$ is therefore obtained by passing the signal corresponding to $E_1$ through an inverter 2. Similarly the signal corresponding to $F_2$ is obtained by passing the signal corresponding to $F_1$ through an inverter 3.

Considering now the derivation of the signal corresponding to the digit $B_3$, it will be appreciated that the gates 4 and 5 of FIGURE 2 have supplied to them the signals supplied by the source 1 in respect of the digits $B_1$ and $B_2$. The gate 4 thus supplies an output when the digits $B_1$ and $B_2$ are both equal to "1" while the gate 5 supplies an output when those digits are both equal to "0." The gate 6 to which the signals supplied by the gates 4 and 5 are fed, therefore, supplies a signal corresponding to the digit value "1" whenever the digits $B_1$ and $B_2$ have the same value. In other words the signal supplied by the gate 6 in this case corresponds to the required digit $B_3$. The digits $C_3$ and $D_3$ are derived in exactly the same manner as that described with respect to digit $B_3$. It can similarly be shown that the circuit of FIGURE 3 operates to supply a signal from the gate 7 which represents either the digit $A_1$ or $A_2$.

The digit $A_3$ is derived from the signal representing the digits $A_1$ and $A_2$ by means of a further circuit which is as shown in FIGURE 2.

The signals corresponding to the sixteen digits representing each words are utilised to control sixteen electromagnetic recording heads, shown collectively in FIGURE 1 by the rectangle 9, for the purpose of recording these digits on sixteen parallel tracks of a magnetic tape. In fact the sixteen digits are divided up into two groups, each of eight digits, which are recorded at different positions along the tape, as shown in the following table:

*Table II*

| Track Number | First Group | Second Group |
|---|---|---|
| 1 | $E_1$ | ----- |
| 2 | $E_2$ | ----- |
| 3 | ----- | $B_1$ |
| 4 | ----- | $B_2$ |
| 5 | ----- | $B_3$ |
| 6 | $C_1$ | ----- |
| 7 | $C_2$ | ----- |
| 8 | $C_3$ | ----- |
| 9 | ----- | $D_1$ |
| 10 | ----- | $D_2$ |
| 11 | ----- | $D_3$ |
| 12 | $A_1$ | ----- |
| 13 | $A_2$ | ----- |
| 14 | $A_3$ | ----- |
| 15 | ----- | $F_1$ |
| 16 | ----- | $F_2$ |

(The tracks are numbered consecutively across the tape.)

The positions along the tape of the two groups of digits representing a word are such that the second group of digits is recorded midway between the first group of digits associated with the same word and the first group of digits associated with the next word.

In fact the sixteen signals are supplied to sixteen gates 30–1 to 30–16 together with one or other of two pulse signals supplied by a pulse generator 31 over leads 32 and 33. The signals passed by the gates 30–1 to 30–16 are fed to sixteen bistable circuits 34–1 to 34–16 each of which is arranged to provide the signal passed to an associated writing head.

The pulse signals supplied by the genertor 31 over leads 32 and 33 consists of trains of regularly recurrent pulses, the pulses 35 on the lead 32 occurring midway between pulses 36 on the lead 33.

Considering for a moment the signal supplied to the gate 30–1 in respect of the digit $E_1$, this gate will pass a voltage upon each occurrence of a pulse on the lead 33 when the digit $E_1$ has the value "1" but not when it has the value "0." Each such voltage passed by the gate 30–1 causes the bistable circuit 34–1 to change from either one of its two stable conditions to the other. The writing heads associated with the bistable circuit 34–1 is magnetically biassed so that when that circuit is in one condition the portion of the tape under that head is magnetically saturated in one direction while when the circuit is in its other condition the tape is magnetically saturated in the other direction. The recurrence frequency of the pulses 36 is equal to the frequency at which the digits $E_1$ are being supplied by the word source 1 and it follows therefore, that when the digit $E_1$ is equal to "0" there is no change in the sense of magnetisation of the appropriate track on the tape while there is such a change when the digit is equal to "1."

In similar manner the digits $E_2$, $B_1$, $B_2$, $B_3$, $C_1$, $C_2$, $C_3$, $D_1$, $D_2$, $D_3$, $A_1$, $A_2$, $A_3$, $F_1$ and $F_2$ are recorded on the appropriate tracks. The sixteen individual writing heads are disposed in a line at right angles to the direction of travel of the tape but since the gates 30–1, 30–2, 30–6, 30–7, 30–8, 30–12, 30–13, and 30–14 are conditioned by the pulses supplied by the pulse generator 31 to pass voltages at different instants of time to the gates 30–3, 30–4, 30–5, 30–9, 30–10, 30–11, 30–15 and 30–16, the actual recording on the tape is in the manner discussed above with reference to Table II.

From the way in which Table I is constructed, it will be appreciated that in the recording of each word at least one digit of each sub-group of either the first or second group (see Table II) that are recorded on adjacent tracks (for example the digits $E_1$ and $E_2$ or the digits $D_1$, $D_2$ and $D_3$) will have the value "1."

During use of the apparatus so far described, the tape is wound on a spool in the usual manner as data is being recorded on it. Subsequently when recorded data is to be read back, say into a computer, the tape is passed under a group of electromagnetic reading heads which are associated one with each track on the tape. In FIGURE 4 of the accompanying drawings these heads are represented collectively by the rectangle 37. The individual heads arranged in a line at right angles to the direction of movement of the tape and each head supplies a pulse when there is a change in the direction of magnetisation of the associated track-passing under the head, the pulse either being positive-going or negative-going depending upon the direction of the change of magnetisation. The rate of reading is such that one complete word is read from the tape approximately every 22 microseconds.

Amplifiers 38–1 to 38–16 are connected between the individual reading heads and circuits 39–1 to 39–16 which are each arranged to supply a unidirectional pulse in response to either a positive-going or negative-going pulse supplied thereto. Thus whenever a change in the direction of magnetisation of one of the tracks (signifying a "1") is sensed by a reading head, a pulse is supplied by the appropriate one of the circuits 39–1 to 39–16 over leads 41–1 to 41–16.

It will be appreciated that pulses on each of the two groups of leads 41–1, 41–2, 41–6, 41–7, 41–8, 41–12, 41–13, 41–14 and 41–3, 41–4, 41–5, 41–9, 41–10, 41–11, 41–15, 41–16 may not occur simultaneously and the circuitry of FIGURE 4 (in conjunction with that of FIGURE 5) brings corresponding voltage changes on each of two corresponding groups of the leads 42–1 to 42–16 into time alignment. (This non-alignment is due to the practical problem previously discussed herein of ensuring that all the writing and reading heads of the system are correctly positioned and that there is no distortion of the tape between writing and reading.)

In FIGURE 4 there are provided three groups of bistable circuits 43–1 to 43–16, 44–1 to 44–16 and 45–1 to 45–16 and two groups of gating circuits 46–1 to 46–16 and 49–1 to 49–16 between the leads 41–1 to 41–16 and the leads 42–1 to 42–16. It will be noted that in this figure all the items solely for handling information derived from any particular track on the tape are referenced with the number of the track as a suffix.

The circuit of FIGURE 4 is arranged to operate (as will subsequently be described more fully) so that each digit as read from the tape is first stored in the bistable units 43–1 to 43–16. This information is then transferred to the bistable circuits 44–1 to 44–16 a sub-group at a time and finally to the bistable circuits 45–1 to 45–16 a group at a time, the terms "sub-group" and "group" here being used in the same sense as previously in connection with Table II. In fact, when information in respect of any particular sub-group of digits has been stored in the appropriate bistable circuits 43–1 to 43–16, the information already stored in those circuits in respect of the next adjacent sub-group or sub-groups (each of which sub-groups is in the other group to that of the sub-group under consideration that has just been stored) is passed via the associated gating circuits 46–1 to 46–16 to the appropriate bistable circuits 44–1 to 44–16. Again when information in respect of all the sub-groups of a particular group of digits has been passed to the bistable circuits 44–1 to 44–16, the information already stored in those circuits in respect of the next previous groups is passed via the appropriate gating circuits 49–1 to 49–16 to the associated bistable circuits 45–1 to 45–16.

Each of the bistable circuits 43–1 to 43–16 has two output leads 47–1, 47–2, . . . or 47–16 and 48–1, 48–2, . . . or 48–16, that carry binary signals that are the inverse of one another. Thus if, for example, there is a voltage on the lead 47–3 as a result of the digit "1" having been read from track No. 3 on the tape, there is no such voltage on the lead 48–3 while these voltages would have been reversed if the digit had been "0."

In addition to being connected to the gating circuits 46–1 to 46–16, the leads 47–1 to 47–16 are also connected to gates 50 to 55, in the manner shown in FIGURE 5, each of these gates being arranged to supply an output voltage when there is a voltage on any of the leads connected thereto. (The two gates 50 and 55 each have an additional input the purpose of which will be described subsequently.) Further gates 56 to 61 are associated with the gates 50 to 55 respectively, each of the gates 56, 58 and 60 being arranged to supply a voltage when there is a voltage on a lead 63 and a voltage is being supplied by the associated gates 50, 52 or 54 while each of the gates 57, 59 and 61 supplies a voltage when there is a voltage on a lead 64 and a voltage is being supplied by the associated gates 51, 53 or 55.

Pulse formers 65 to 70 are associated one with each of the gates 56 to 61, each of these pulse formers being arranged to supply an output pulse having a duration of approximately one microsecond upon the commencement of a voltage supplied by the associated gate. The pulse formers 65 to 70 are connected by way of leads 72 to 77 to the bistable circuits 43–1 to 43–16, for the purpose of resetting those circuits.

A coincidence gate 78 is connected to the gates 56, 58 and 60 and to a further gate 81 while a coincidence gate 79 is connected to the gates 57, 59 and 61. Voltages supplied by the gates 78 and 79 over leads 81 and 82 are passed via a gating circuit 83 to a bistable circuit 84 upon each occurrence of a clock pulse supplied over lead 85. (The gating circuit 83 is marked "2 x 2" in FIGURE 5 to signify that it is, in fact, two separate gates, one of which serves to detect coincidence of voltages on leads 81 and 85 while the other serves to detect coincidence of voltages on leads 82 and 85. It will be noted that this method of marking gating circuits is used elsewhere in FIGURES 4 and 5.)

The clock pulses supplied over the lead 85 and elsewhere in the circuit of FIGURE 5 (as subsequently described) have a pulse recurrence frequency of one megacycle per second.

Pulses passed by the gating circuit 83 are utilized to control the bistable circuit 84, so that it takes up the appropriate condition (if not already in that condition) upon the cessation of each said pulse. The circuit 84 has two output leads 86 and 87 and at any time there is a voltage on one of these leads and not on the other. The leads 86 and 87 are connected to gating circuit 88 to which clock pulses are supplied over a lead 89. Pulses passed by the gating circuit are fed to a further bistable circuit 91 which is set to one or other of its stable conditions in similar manner to the bistable circuit 84.

The bistable circuit 91 has two output leads 92 and 93 (to which are connected the leads 64 and 63 respectively) and is followed by another gating circuit 94, which gates the voltages on those leads with clock pulse supplied over lead 95, and another bistable circuit 96. Thus when a clock pulse is passed by the gating circuit 83 to change the condition of the bistable circuit 84, the next clock pulse causes the bistable unit 91 to change its condition and the following clock pulse causes the bistable unit 96 to change its condition.

Consider now the situation when the bistable circuits 84 and 91 are set so that there are voltages on the leads 86 and 92. (It will be appreciated that this situation will occur shortly after a voltage has been supplied by the gate 78. As will subsequently be apparent, such a voltage is supplied by the gate 78 when the bistable circuits 43–3, 43–4, 43–5, 43–9, 43–10, 43–11, 43–15 and 43–16 have all been set to conditions determined by the preceding group of digits read off from tracks Nos. 3, 4, 5, 9, 10, 11, 15, and 16 on the tape. Furthermore, at this time the bistable circuits 43–1, 43–2, 43–6, 43–7, 43–8, 43–12, 43–13, and 43–14 have all been set so that there are voltages on their associated output leads 48–1, 48–2, 48–6 etc. . . . ) When subsequently the next digits are read off from the tracks Nos. 1 and 2 on the tape, one of the bistable circuits 43–1 and 43–2 is set in dependence upon those digits and, due to the fact that this sub-group must contain one "1" (assuming for the present that there is no error), there is a voltage on one of the leads 47–1 and 47–2. Accordingly the gate 51 supplies a voltage to the gate 57 which in turn supplies a voltage to the pulse former 66 since there is already a voltage on the lead 64. The resulting pulse supplied by the pulse former 65 causes the gating circuits 46–3, 46–4 and 46–5 to pass voltages to cause the bistable circuits 44–3, 44–4 and 44–5 to be set to the same conditions as the bistable circuits 43–3, 43–4 and 43–5 respectively while the circuits 43–3, 43–4 and 43–5 are all reset to their conditions corresponding to the digit "0" upon the cessation of that pulse.

Similarly the digits read off in respect of the group referred to in the last paragraph from the tracks Nos. 6, 7, 8, 12, 13 and 14 on the tape, cause pulses to be supplied by the pulse formers 68 and 70 so that the digits previously stored by the appropriate bistable circuits (of which only the circuits 43–15 and 43–16 are shown in FIGURE 5) in respect of the preceding group are transferred to the bistable circuits such as the circuits 44–15 and 44–16 and the bistable circuits 43–15, 43–16 etc. are reset.

Thus by the time all the digits of the said preceding group have been stored by the appropriate bistable circuits 44, voltages have been supplied by all the gates 57, 59 and 61 so that a voltage is then supplied by the gate 79. After a short delay, a corresponding voltage therefore appears on the lead 93 and at this time (before the next clock pulse on the lead 95) the bistable circuit 96 is in its condition to supply a voltage over lead 97. A gate 80 detects this coincidence of voltages on leads 93 and 97. The voltage supplied by the gate 80 is supplied to a coincidence gate 98 together with clock pulses supplied over a lead 99. The resulting pulse is fed over lead 101 to the gating circuits 49–3, 49–4, 49–5, 49–9, 49–10, 49–11, 49–15, and 49–16 (some of which are not shown in FIGURE 4) so that voltages are then passed thereby to set the associated bistable circuits 45–3, 45–4, 45–5 etc. respectively to the conditions of the associated bistable circuits 44–3, 44–4, 44–5 etc.

It will be appreciated that simultaneously with the appearance of a voltage on the lead 93, the voltage that was previously on the lead 92 disappears so that the gates 56, 58 and 60 cannot then supply voltages and it follows that, at this time, no transfer pulses can be generated as aforesaid by the pulse formers 65, 67 and 69.

Since however, there is now a voltage on the lead 93, the next group of digits read off from tracks Nos. 3, 4, 5, 9, 10, 11, 15 and 16 on the tape (these digits being stored by the appropriate bistable circuits 43–3, 43–4, 43–5, 43–9 etc. immediately after reading) are transferred to the corresponding bistable circuits 44–3, 44–4, 44–5, 44–9 etc. and the bistable circuits 43–3, 43–4, 43–5, 43–9 etc. are reset in the manner described in the preceding paragraphs. When this transfer has been completed a voltage is supplied by the gate 78 (there being no voltage supplied by the gate 80 at this time because of the disappearance of the voltage in the lead 97) so that subsequently a voltage appears again on the lead 92 and the coincidence of this voltage and the voltage then appearing in the other output lead 102 of the bistable circuit 96 is detected by a gate 103. Coincidence of the voltage supplied by the gate 103 and a clock pulse supplied over a lead 104 is determined by a gate 105 and the resulting pulse is passed over lead 106 to the gating circuits 49–1, 49–2, 49–6, 49–7, 49–8, 49–12, 49–13 and 49–14 (FIGURE 4) so that the digits stored by the corresponding bistable circuits 44–1, 44–2, 44–6 etc. are transferred to the appropriate bistable circuits 45–1, 45–2, 45–6 etc.

It will be noted that the conditions to which the bistable circuits 43–3, 43–4, 43–5, 43–9 etc. have now been set and the voltage on the lead 92 is as originally assumed. The arrangement of FIGURES 4 and 5 thus continues to operate cyclically in respect of successive groups of digits read off from the tape in the manner described.

It has so far been assumed (as is the case if there are no errors) that at least one digit in each sub-group has the value "1." In fact the arrangement of FIGURES 4 and 5 operates if any one sub-group has an error such that it does not contain a digit having the value "1." (In fact FIGURES 4 and 5 will continue to operate even if there are several such errors but since the following circuitry (of FIGURE 7) will only handle a single error there is no point in considering multiple error cases here.) It will be seen that the transfer pulses which are supplied by the pulse formers 66, 67, 68, and 69 and which are utilized to transfer, as aforesaid, sub-groups of digits read off from tracks other than the two outer pairs, namely tracks Nos. 1 and 2 and tracks Nos. 15 and 16, may each be derived from either of the two sub-groups of digits which are in the other group to the sub-group in question and which are recorded on adjacent tracks. For example a pulse is supplied by the pulse former 66 to transfer a sub-group of digits read off from the tracks Nos. 3, 4 and 5, consequent upon a voltage being supplied by the gate 51, if a voltage appears on any one of the leads 47–1, 47–2, 47–6, 47–7 and 47–8 as a result of there being a digit having the value "1" in the succeeding two sub-groups read off from tracks Nos. 1, 2, 6, 7 and 8.

As far as the transfer of sub-groups of digits read off from tracks Nos. 1 and 2 are concerned, a circuit 107 is provided to supply a suitable delayed voltage over lead 108 to the gate 50 after a digit having the value "1" has been read off from those two tracks, the pulse former 65 thus supplying a pulse if there is a digit having the value "1" in adjacent sub-groups read off from the tracks Nos. 1, 2, 3, 4 and 5. The circuit 107 comprises a shift register 110 all the stages of which are reset by clock pulses passed through a gate 109 so long as there is no voltage supplied by a gate 111. The gate 111 is connected to the leads 47–1 and 47–2 and is arranged to supply a voltage when there is a voltage on either of those leads (as a result of a digit having the value "1"

being read off from either track No. 1 or track No. 2), this voltage being supplied together with the clock pulses on lead 112 to a coincidence gate 113. A pulse supplied by the gate 113 triggers the first stage of the register 110 from its reset condition and subsequent clock pulses supplied over the lead 112 cause successive stages of the register to be triggered.

Assuming for the present that there is no voltage at this time on the lead 114, a voltage is supplied by a gate 115 to a gating circuit 116 when the last stage of the shift register 110 has been triggered with the result that the next clock pulse on lead 117 is passed to a bistable circuit 118 which is triggered to its condition to cause a voltage to be supplied over lead 108 to the gate 50. The lead 114 is connected to the gate 103 so that a voltage is supplied to the lead 114 when coincidence of voltages on leads 92 and 102 is detected by that gate. It will be recalled that this condition causes digits stored by the bistable circuits 44–1 and 44–2 to be transferred to the bistable circuits 45–1 and 45–2 and the voltage then occurring on the lead 114 prevents the bistable circuit 118 being triggered at that time to supply a voltage over lead 108 and, if the circuit 118 has previously been so triggered, causes the next clock pulse to be passed by the gating circuit 116 to trigger the bistable circuit 118 to its other condition.

A circuit 119, which is identical to the circuit 107, is associated with tracks Nos. 15 and 16 in similar manner.

Although not in any way concerned with the present invention and accordingly not described herein, it may be mentioned that it is desirable to ensure that the bistable circuits of FIGURES 4 and 5 are set prior to data being read from a length of tape to the appropriate conditions to enable data to be read in the manner previously described. Briefly this may be done by supplying a first starting voltage as an input to each of the gates 50 to 55 (over a lead not shown in FIGURE 5) so that there is then an input to all the coincidence gates 56 to 61. Approximately 11 microseconds later, by which time the bistable circuits 43–1 to 43–16, 44–1 to 44–16 and 45–1 to 45–16 have settled down, and while the first starting voltage is still being supplied to the gates 50 to 55, a second starting voltage is supplied over a lead (not shown) to the gate 78. The first and second starting voltages are then switched off, in that order, whereupon the arrangement is ready to respond to data read off from the tape.

It will be appreciated from the foregoing that, apart from errors that have arisen as a result of the data being recorded, the signals supplied over the leads 42–1 to 42–15 correspond to the digits $E_1$, $E_2$, $B_1$, $B_2$, $B_3$, $C_1$, $C_2$, $C_3$, $D_1$, $D_2$, $D_3$, $A_1$, $A_2$, $A_3$, $F_1$ and $F_2$ respectively. Referring now to FIGURE 6 of the accompanying drawings which shows the circuits of that part of the reproducing apparatus for correcting at least any single error in a recorded word that may have been introduced during recording, it will be seen that this circuit is largely made up of the individual circuits of FIGURES 7, 8 and 9 together with eight coincidence gates 121 to 128.

Consider now the situation when there are voltages on some of the leads 42–1 to 42–16 representing a particular word. With regard to the sub-group formed by the digits $E_1$ and $E_2$, the voltage or lack of voltage on the lead 129 will correctly represent the digit $E_1$ of the original eight digit word provided there has been no error in this sub-group. The voltages on the leads 42–1 and 42–2 are however supplied to the gates 131 and 132 of the circuit of FIGURE 7 while the voltage supplied by either of the gates 131 or 132 is passed by a further gate 133. It follows therefore that if there is a voltage on the lead 134 there is no error in the sub-group consisting of the digits $E_1$ and $E_2$, that is to say in the fourth column of the code set out in Table I.

The circuit of FIGURE 9 to which are connected the leads 42–1, 42–3, 42–6, 42–9 and 42–12 operates to supply a voltage over lead 135 if the sum of the digits $B_1$, $C_1$, $D_1$, $E_1$ and $A_1$ is even, that is to say so long as there is no error in the top row of Table I. Accordingly it will be realised that unless the value for the digit $E_1$ is in error and that is the only error in the digits $A_1$, $B_1$, $C_1$, $D_1$, $E_1$ and $E_2$, there will be a voltage on one or both of the leads 134 and 135. The gate 122 thus only supplies a voltage when it has been ascertained that the value of the digit $E_1$ represented by the voltage on the lead 129 is in error. The circuit of FIGURE 7 to which the leads 129 and 136 are connected operates so that if there is no voltage on the lead 136, the voltage, if any, on the lead 129 is passed to the output lead 137 while if there is a voltage on the lead 136 (indicating an error as aforesaid) a voltage is supplied to the lead 137 if there is no voltage on the lead 129 or vice versa. The voltage on the lead 137 thus represents the corrected digit $E_1$.

Referring now to FIGURE 8, the gates 173 to 177 are arranged so that the gate 177 supplies a voltage only if there are voltages on all three of the input leads 170, 171 and 172 or if there is a voltage on only one of the leads 170, 171 and 172. (In other words there is no voltage supplied by the gate 177 is none or two only of the leads 170, 171 and 172 have voltages thereon.)

Reverting now to FIGURE 6, it will be seen that the leads 42–3, 42–4 and 42–5 are connected to a circuit as shown in FIGURE 8 and it follows therefore that a voltage is supplied over lead 179 provided there is no single error in the digits $B_1$, $B_2$ and $B_3$ which constitute the left-hand column of Table I.

As already explained, a voltage is supplied over lead 135 if there is no single error in the top row of Table I. The leads 135 and 179 are connected to the gate 128 so that a voltage is supplied over lead 180 only if there is no voltage on both the leads 135 and 179, this situation occurring if an error occurs in the representation of digit $B_1$. Voltages on the leads 42–3 and 180 are supplied to a circuit as shown in FIGURE 7 so that the voltage supplied over lead 144 represents the digit $B_1$ (corrected if necessary).

In exactly similar manner to that described in the last two paragraphs, the circuit of FIGURE 6 operates to supply voltages over leads 139 to 143 that represent the corrected digits $B_2$, $C_1$, $C_2$, $D_1$ and $D_2$. A voltage representing the corrected digit $F_1$ is derived in similar manner to the digit $E_1$, this voltage being supplied over a lead 138.

It will be appreciated that the voltages on the leads 42–1 to 42–16 do not all change simultaneously when going from the representation of one word to another. Moreover, the circuit of FIGURE 6, as so far described, responds not only to the required combination of the first and second groups of digits associated with each word but also responds to the combination of the second group of eight digits in respect of any particular word and the first group of eight digits in respect of the next succeeding word. The voltages on the leads 137 to 144 in respect of the latter combination are not useful and, in order to select only the desired voltages on the leads 137 to 144, there are provided eight coincidence gates 145 to 152 to all of which a controlling signal is supplied over a lead 153.

Referring now again to FIGURE 5, the lead 153 is connected to the last stage of a shift register 154. The first stage of the register 154 is arranged to be set to one of its stable conditions by a pulse supplied by a gate 155 and to its other stable condition by a pulse supplied by a gate 156, the gate 155 being arranged to detect coincidence of a voltage supplied by the gate 81 and clock pulses over a lead 157 and the gate 156 being responsive to clock pulses on the lead 157 and the absence of voltage supplied by the gate 80. Pulses on the lead 157 are also supplied to the shift register 154 as shift pulses. It will be recalled that the gate 81 periodically supplies a voltage to cause the second group of digits in respect of each word, these digits having been previously read off from tracks Nos. 3, 4, 5, 9, 10, 11, 15 and 16 on the tape, to be transferred to the appropriate bistable circuits 35 and it follows that after a short delay (determined by the register 154) a pulse of approximately 1 microsecond duration is fed over lead 153.

Whenever there is a pulse on the lead 153 the gates 145 to 152 are conditioned to transfer the voltages on the leads 137 to 144 to the leads 158 to 165. Pulse signals representing the required data are therefore supplied over leads 158 to 165.

We claim:

1. Apparatus for the reproduction of digital data recorded on a record medium having first and second groups of parallel tracks on each of which are recorded groups of digits, one digit of each group being recorded on each of the appropriate group of tracks and groups of digits recorded on the first and second groups of tracks alternating along the record medium, and the groups of digits being each divided into sub-graphs which are recorded on a plurality of adjacent tracks while those of the first group of tracks on which sub-groups of digits are recorded are interleaved with similarly arranged tracks of the second groups of tracks, said apparatus comprising (a) a plurality of reading means to cooperate respectively with the pluarlity of tracks of said first and second groups thereof and to supply signals representative of the digital information recorded on those tracks, (b) a like plurality of first storage means respectively to store the digit value read from the plurality of tracks by the reading means, (c) a like plurality of second storage means which are each associated with one of the first storage means, (d) a like plurality of third storage means which are each associated with one of the second storage means, (e) a like plurality of first transfer means to transfer the digit values stored by those of the first storage means which are arranged to store a sub-group of digits to the associated second storage means in response to an adjacent sub-group of digits being read from tracks that are adjacent to those from which the sub-group of digits in question had previously been read, and (f) a like plurality of second transfer means to transfer the digit values stored by those of the second storage means which are arranged to store a group of digits read from one of the groups of tracks to the associated third storage means in response to all sub-groups of digits read from the other group of tracks being stored by the appropriate second storage means.

2. Apparatus for the reproduction of digital data recorded on a magnetic tape having a plurality of tracks, said apparatus comprising (a) a plurality of electromagnetic reading heads which are equal in number to the number of tracks and which are divided into two groups with each group further divided into a plurality of sub-groups, (b) the reading heads in each sub-group being associated with adjacent tracks and the sub-groups of the two groups being interleaved, (c) a like plurality of first storage means to store digit values read respectively by the reading heads from the plurality of tracks, (d) a like plurality of second storage means which are associated respectively with the first storage means, (e) a like plurality of third storage means which are associated respectively with the second storage means, (f) a plurality of first control means each associated with those of the first storage means that are arranged to store digits values read by a sub-group of reading heads to supply a control signal upon the appropriate first storage means storing digits read by an adjacent sub-group of reading heads, (g) a plurality of first gating means which are connected one between each associated first and second sotrage means and which are responsive to control signals supplied by the first control means associated with the appropriate first storage means to cause signals to be passed to the appropriate second storage means and thereby to cause the digit values then stored by the appropriate first storage means to be stored by the appropriate second storage means, (h) two second control means which are respectively associated with those of the second storage means that are arranged to store digit values read by the two groups of reading heads and each of which second control means supplies a control signal upon the second storage means that are not associated aforesaid with that control means storing digits read from the tape by the appropriate group of reading heads, and (i) a plurality of second gating means which are connected one between each associated second and third storage means and which are responsive to control signals supplied by the second control means associated with the appropriate second storage means to cause signals to be passed to the appropriate third storage means and thereby to cause the digit values then stored by the appropriate second storage means to be stored by the appropriate third storage means.

3. Apparatus according to claim 2 wherein at least the first control means associated with those of the first storage means that store digit values read by a particular sub-group of reading heads supplies a control signal to the first gating means connected to those first storage means in response to any one of the first storage means that are arranged to store digit values read by either of two adjacent sub-groups of reading heads storing a particular digit value.

4. Apparatus according to claim 2 wherein at least the first control means associated with those of the first storage means that store digit values read by a particular sub-group of reading heads supplies a control signal to the first gating means connected to those first storage means in response to any one of the first storage means that are arranged to store digit values read either by an adjacent sub-group of reading heads or by said particular sub-group itself storing a particular digit value.

5. Apparatus for the reproduction of digital data which is so recorded on a plurality of parallel tracks on a recording medium that between successive groups of digits recorded one on each of a first group of said tracks there are groups of digits similarly recorded on a second group of said tracks, said apparatus comprising (a) a first plurality of reading means to co-operate respectively with the first group of tracks and to supply signals representing the digital information recorded on those tracks, (b) a second plurality of reading means to co-operate respectively with the second group of tracks and to supply signals representing the digital information recorded on those tracks, (c) a first plurality of storage means respectively to store the digit values read from the first group of tracks by the first plurality of reading means, (d) a second plurality of storage means respectively to store the digit values read from the second group of tracks by the second plurality of reading means, (e) first and second paths, (f) first control means to supply to the first path a first control signal when a group of digits is read from the second group of tracks by the second plurality of reading means, (g) second control means separate from the first control means to supply to the second path a second control signal when a group of digits is read from the first group of tracks by the first plurality of reading means, (h) first gating means to supply signals characteristic of the digit values stored by the first plurality of storage means in respect of a group of digits in response only to the occurrence of the first control signal supplied by the first control means over the first path, and (i) second gating means to supply signals characteristic of the digit values stored by the second plurality of storage means in respect of a group of digits in response only to the occurrence of a second control signal supplied by the second control means over the second path.

References Cited by the Examiner

UNITED STATES PATENTS

| | | | |
|---|---|---|---|
| 2,679,638 | 5/1954 | Bensky et al. | 340—174.1 |
| 2,977,578 | 3/1961 | Daniels et al. | 340—174.1 |
| 3,088,102 | 4/1963 | Dirks | 340—174.1 |

IRVING L. SRAGOW, *Primary Examiner.*

R. M. JENNINGS, A. I. NEUSTADT, *Assistant Examiners.*